April 12, 1955
J. J. CANTOR
2,706,101
VALVE
Filed April 7, 1951
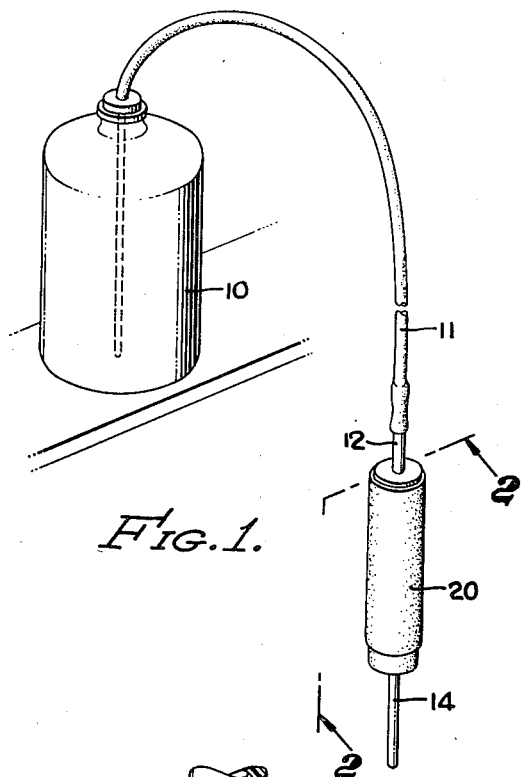
Fig. 1.
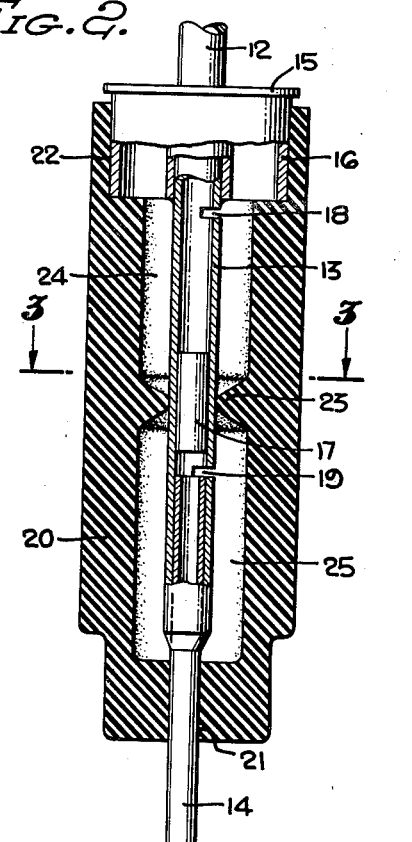
Fig. 2.
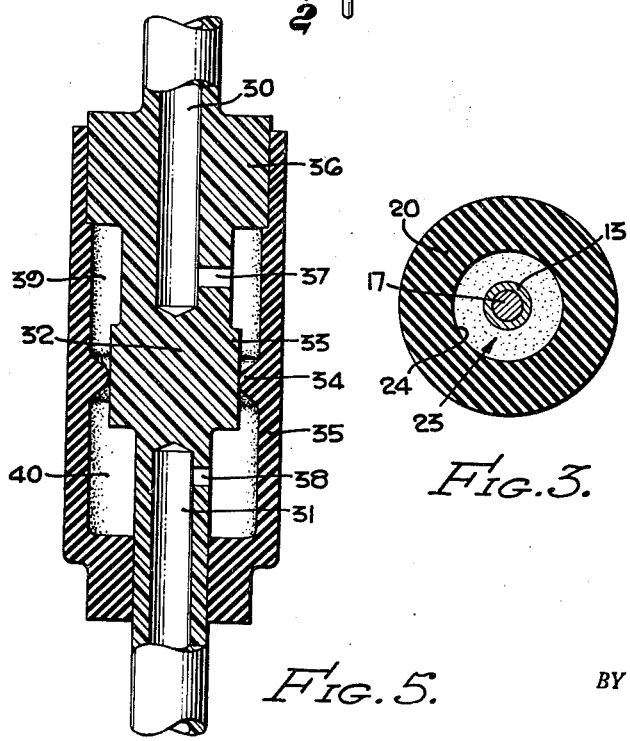
Fig. 3.   Fig. 4.   Fig. 5.
JACOB J. CANTOR,
INVENTOR.
BY
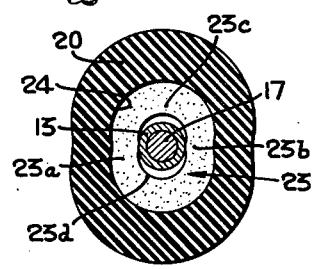
ATTORNEYS

United States Patent Office

2,706,101
Patented Apr. 12, 1955

2,706,101

VALVE

Jacob J. Cantor, Los Angeles, Calif.

Application April 7, 1951, Serial No. 219,863

4 Claims. (Cl. 251—4)

This invention relates to improvements in valves, and concerns that type of valve that may be advantageously employed to control the flow of liquids through siphon tubes, pipettes, and similar conduits.

A primary object of the invention is to provide an improved and highly simplified form of valve construction that will control the flow of fluid through a conduit and which is so designed that when the valve is externally squeezed liquid will be permitted to flow freely through the conduit, and when the valve is released, the flow of the liquid will be immediately and automatically arrested.

With the foregoing and other objects in view, which will be made manifest in the folloiwng detailed description and specifically pointed out in the appended claims, reference is had to the accompanying drawings for an illustrative embodiment of the invention, wherein:

Figure 1 is a perspective view schematically illustrating one application of the improved valve;

Fig. 2 is a sectional view through the valve taken substantially upon the line 2—2 upon Fig. 1;

Fig. 3 is a horizontal section taken substantially upon the line 3—3 upon Fig. 2;

Fig. 4 is a view similar to Fig. 3, but illustrating the valve as having been deformed or distorted from its normal condition so as to enable fluid flow to take place; and Fig. 5 is a view similar to Fig. 2, but illustrating an alternative form of construction.

Referring to the accompanying drawing wherein similar reference characters designate similar parts throughout, I have illustrated one situation wherein the improved valve may be advantageously used, but it will be understood that the application of the valve is in no way restricted thereto.

As illustrated, 10 may be regarded as a demijohn or reservoir containing a liquid such as water or any one of a number of liquid chemicals. 11 indicates a flexible siphon tube connected therewith for siphoning over liquid as it may be required. The improved valve consists essentially of a relatively stiff conduit. This conduit in the form illustrated in Figs. 1 to 4, is shown as being made up of metal sections, the uppermost of which illustrated at 12 is suitably shaped at its upper end for the attachment thereto of the siphon tube 11. Within the upper section 12 there is secured an intermediate section 13 and a lower section 14 is secured to the lower end of the intermediate section 13. The upper section 12 has a flange 15 secured thereto to which there is secured a cylindrical collar 16.

The conduit as made up of the sections 12, 13, and 14, has a dam therein intermediate its ends, such dam being indicated at 17. Above the dam 17 there is a lateral outlet 18 from the conduit. Below the dam there is a lateral inlet 19 back into the conduit.

Surrounding the conduit there is a resilient rubber sleeve 20 preferably molded to shape and vulcanized so that it is highly resilient. Its lower end is so formed as to snugly fit at 21 around the lower section 14. The upper end of the sleeve is so shaped as indicated at 22 as to snugly fit around the collar 16. Intermediate the ends of the sleeve there is an internal flange 23 integral therewith which is engageable with the exterior of the intermediate section 13 in the neighborhood of the dam 17. Preferably, the internal diameters at the ends 21 and 22 and the internal diameter of the internal flange 23 are such that in applying the sleeve to the conduit it is necessary to slightly stretch the sleeve. In this manner, the ends of the sleeve will contract and snugly hug the collar 16 and the section 14, respectively, and the flange 23 when released will normally press slightly against the exterior of the intermediate section 13.

Assuming that the siphon has been started so that the siphon tube 11 is filled with liquid, this liquid may escape from the conduit through the outlet 18 into the chamber 24 that is defined within the sleeve above the dam 17 by the internal flange 23. When the flange is released the engagement between the flange 23 and the section 13 prevents escape of liquid from the chamber 24. However, if the sleeve is laterally pressed and deformed into the shape as shown in Fig. 4, the flange 23 is compressed on opposite sides as indicated at 23a and 23b. 90° from these laterally compressed portions the flange 23 is bulged outwardly or spaced from the sides of the conduit as indicated at 23c and 23d. The spacing is illustrated somewhat exaggeratedly in Fig. 4, but is nevertheless sufficient to enable liquid to flow from the upper chamber 24 to the lower chamber 25. From the lower chamber 25 the liquid may flow through the inlet 19 and be discharged from the lower end of the lower section 14. Whenever the sleeve is released its inherent resiliency causes it to return to normal or into that position shown in Figs. 2 and 3. Therein, the flange 23 hugs the conduit in the neighborhood of the dam 17 and prevents further flow through the conduit.

If the extension 14 has a relatively narrow internal diameter and is relatively long, it is found that on releasing the valve enabling it to automatically shut off the flow of liquid, the liquid which remains in the lower section 14 will stay there without dripping. Consequently, whenever it is desired to withdraw liquid from the demijohn 10 it is possible to withdraw this merely by squeezing the opposite sides of the resilient sleeve. On release of the sleeve further flow of liquid is automatically stopped and the valve may, if desired, be completely released so that it is suspended entirely by the siphon tube 11. Under these conditions, dripping of liquid from the lower section 14 will not take place.

In the construction shown in Fig. 5, the conduit is made up of a plastic section that is a molded section of synthetic resin plastic. The ends of the conduit indicated at 30 and 31, respectively, are separated from each other by an intervening dam 32. The plastic section may be externally enlarged as at 33 surrounding the dam providing a seat for the internal flange 34 on the flexible sleeve 35. The upper end of the conduit may be externally enlarged as at 36 providing a suitable seat for the upper end of the sleeve. The lower end of the sleeve fits snugly around the lower portion of the conduit. In this form of construction, holes 27 and 38 provide an outlet and inlet, respectively, the outlet discharging into the chamber 39 above the flange 34 and the inlet conducting off liquid from the lower chamber 40 that is disposed below the flange 34. In this form of construction the operation and advantages are substantially the same as previously described. Laterally compressing diametrically opposite sides of the sleeve adjacent the flange 34 causes the flange to be distorted somewhat as depicted in Fig. 4, enabling liquid to flow from chamber 39 through chamber 40 and into the lower portion 31 of the conduit. When the sleeve is released it automatically returns to its normal position cooperating with the dam 32 to prevent further flow until such time as the sleeve may again be distorted.

In the preferred form of construction the upper end of the sleeve is enlarged to fit the collar 16 or the enlargement 36 as the case may be. Such an enlargement is not absolutely essential but it is preferable in that it enables cores used to core out the chambers 24 and 25 and 39 and 40 to be easily pulled from the molded rubber article after the rubber stock has been molded and vulcanized.

From the above-described construction it will be appreciated that the improved valve may be very easily and economically manufactured and may be applied to any form of conduit having a dam therein with lateral outlets and inlets above and below the dam which can be arranged in communication with the chambers within the sleeve that are defined from each other by the internal flange 23 or 34. The improved valve may be used not only in conjunction with siphons but may be used in connection with any source of liquid that is under relatively low pressure incapable of expanding the sleeve sufficiently to cause the internal flange to leak.

It is obvious that the relationship of parts is subject to reversal. That is, the internal flange 23 may be arranged on the section 13 itself as an external flange that is normally engaged by the cylindrical internal surface of the sleeve. With such a reversal in the arrangement of the flange the operation and advantages are substantially the same in that the mere application of an external force to the sleeve will cause it to be deformed sufficiently so that a portion of the sleeve will be shifted out of engagement with the flange allowing fluid to flow from the chamber 24 to the chamber 25. On release of the sleeve it inherently returns to its normal position engaging the flange on all sides and arresting further flow.

Various changes may be made in the details of construction without departing from the spirit and scope of the invention as defined by the appended claims.

1. A device of the class described comprising a conduit, means damming said conduit against flow therethrough, a flexible sleeve surrounding said conduit having an internal resilient flange engageable therewith and cooperating therewith opposite the dam to divide the interior of the sleeve into two chambers, there being a lateral outlet from the conduit on one side of the dam into one chamber, and a lateral inlet from the other chamber into the conduit on the other side of the dam whereby when the sleeve is laterally compressed the flange will be distorted with respect thereto allowing fluid flow between the chambers around the dam in the conduit, and when the flange is released to return to its normal position fluid flow between the chambers will be arrested thereby.

2. A valve comprising a resilient sleeve applicable to a conduit, said sleeve having an internal resilient flange engageable with the exterior of the conduit and cooperating therewith to divide the interior of the sleeve into two chambers, means providing an inlet from the conduit into one chamber and an outlet from the other chamber into the conduit, and means damming the conduit against flow therethrough between the chambers whereby when the sleeve is laterally compressed the flange will be distorted to permit flow from one end of the conduit into the other end thereof, and when the sleeve is released flow will be arrested.

3. A valve comprising a conduit having a dam therein, an outlet from the conduit above the dam, an inlet to the conduit below the dam, and a sleeve surrounding the conduit having a resilient internal flange engageable with the exterior of the conduit opposite the dam therein whereby when the sleeve is laterally compressed the flange will be distorted to permit flow from one end of the sleeve to the other, and when the sleeve is released the flange will return to normal position arresting such flow.

4. A valve comprising a conduit having a dam therein, an outlet from the conduit above the dam, an inlet to the conduit below the dam, a sleeve surrounding the conduit defining two chambers, one of which is above the dam and in communication with the outlet and the other of which is below the dam and in communication with the inlet, said sleeve being resilient so that when an external force is applied thereto it will be distorted permitting flow from one chamber to the other and when the sleeve is released it will automatically return to normal position arresting further flow between the chambers.

References Cited in the file of this patent
UNITED STATES PATENTS

| | | |
|---|---|---|
| 274,447 | Kennish | Mar. 20, 1883 |
| 605,693 | Black | June 14, 1898 |
| 820,987 | Perotti | May 22, 1906 |
| 1,418,592 | McGee | June 6, 1922 |
| 2,313,550 | Huber | Mar. 9, 1943 |
| 2,314,767 | Burrell | Mar. 23, 1943 |
| 2,598,122 | Hansen | May 27, 1952 |
| 2,610,300 | Walton | Sept. 9, 1952 |

FOREIGN PATENTS

| | | |
|---|---|---|
| 565,539 | Great Britain | 1944 |